(12) United States Patent
Can et al.

(10) Patent No.: US 9,513,814 B1
(45) Date of Patent: Dec. 6, 2016

(54) BALANCING I/O LOAD ON DATA STORAGE SYSTEMS

(75) Inventors: Khang Can, Framingham, MA (US); Xiangping Chen, Shrewsbury, MA (US); Kevin Bangyen Jiang, Waltham, MA (US); Qin Tao, Hopkinton, MA (US); Mark Ku, Wollaston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1121 days.

(21) Appl. No.: 13/074,164

(22) Filed: Mar. 29, 2011

(51) Int. Cl.
*G06F 12/00* (2006.01)
*G06F 3/06* (2006.01)

(52) U.S. Cl.
CPC .............. *G06F 3/061* (2013.01); *G06F 3/067* (2013.01); *G06F 3/0647* (2013.01); *G06F 12/00* (2013.01)

(58) Field of Classification Search
CPC ......... G06F 12/00; G06F 12/08; G06F 13/00
USPC .................. 711/114, 165, E12.001
See application file for complete search history.

(56) References Cited

U.S. PATENT DOCUMENTS

| 6,275,898 | B1 * | 8/2001 | DeKoning | 711/114 |
|---|---|---|---|---|
| 8,271,757 | B1 * | 9/2012 | Chatterjee et al. | 711/165 |
| 8,429,307 | B1 * | 4/2013 | Faibish et al. | 710/5 |
| 8,478,731 | B1 * | 7/2013 | Throop et al. | 707/693 |
| 8,478,835 | B2 * | 7/2013 | Kimmel et al. | 709/212 |
| 8,489,844 | B2 * | 7/2013 | Orikasa et al. | 711/170 |
| 8,645,654 | B1 * | 2/2014 | Bailey et al. | 711/165 |
| 2005/0097275 | A1 * | 5/2005 | Korgaonkar | G06F 3/0601 711/114 |
| 2009/0077097 | A1 * | 3/2009 | Lacapra et al. | 707/10 |
| 2009/0150639 | A1 * | 6/2009 | Ohata | 711/172 |
| 2009/0172666 | A1 * | 7/2009 | Yahalom et al. | 718/1 |
| 2010/0121828 | A1 * | 5/2010 | Wang | 707/694 |
| 2011/0167236 | A1 * | 7/2011 | Orikasa et al. | 711/165 |
| 2011/0246740 | A1 * | 10/2011 | Yata et al. | 711/165 |
| 2011/0252218 | A1 * | 10/2011 | Davies | 711/209 |
| 2012/0017042 | A1 * | 1/2012 | Matsui et al. | 711/114 |

FOREIGN PATENT DOCUMENTS

WO    WO 2012131749 A1 * 10/2012

OTHER PUBLICATIONS

IP.com technical disclosure "System and method to implement host tiered hot spot tuning on storage" Dec. 1, 2010, IPCOM000202012D.*

* cited by examiner

*Primary Examiner* — Yaima Rigol
*Assistant Examiner* — Tasnima Matin
(74) *Attorney, Agent, or Firm* — Krishnendu Gupta; Jason A. Reyes; Deepika Bhayana

(57) ABSTRACT

A method is used in balancing I/O load on data storage systems. A slice is selected from a first storage container of a storage tier. The storage tier includes a second storage container. The slice is relocated from the first storage container of the storage tier to the second storage container of the storage tier, where I/O load of the first storage container is greater than I/O load of the second storage container.

20 Claims, 13 Drawing Sheets

BALANCING I/O LOAD ON DATA STORAGE SYSTEMS

BACKGROUND

Technical Field

This application relates to balancing I/O load on data storage systems.

Description of Related Art

A traditional storage array (herein also referred to as a "disk storage array", "disk array", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Storage arrays are typically used to provide storage space for one or more computer file systems, databases, applications, and the like. For this and other reasons, it is common for storage arrays to be logically partitioned into chunks of storage space, called logical units, or LUs. This allows a unified storage array to appear as a collection of separate file systems, network drives, and/or Logical Units.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array is the performance of each individual storage component. For example, the read access time of a disk storage array is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall disk array storage. For example, a multihead drive that supports reads or writes on all heads in parallel will have a much greater throughput than a multihead drive that allows only one head at a time to read or write data.

Furthermore, even if a disk storage array uses the fastest disks available, the performance of the array may be unnecessarily limited if only one of those disks may be accessed at a time. In other words, performance of a storage array, whether it is an array of disks, tapes, flash drives, or other storage entities, may also be limited by system constraints, such the number of data transfer buses available in the system and the density of traffic on each bus.

Large storage arrays today manage many disks that are not identical. Storage arrays use different types of disks and group the like kinds of disks into tiers based on the performance characteristics of the disks. A group of fast but small disks may be a fast tier (also referred to as "higher tier"). A group of slow but large disks may be a slow tier (also referred to as "lower tier". It may be possible to have different tiers with different properties or constructed from a mix of different types of physical disks to achieve a performance or price goal. Storing often referenced, or hot, data on the fast tier and less often referenced, or cold, data on the slow tier may create a more favorable customer cost profile than storing all data on a single kind of disk.

A storage tier may be made up of different types of disks, i.e., disks with different RAID levels, performance and cost characteristics. In the industry there have become defined several levels of RAID systems. RAID (Redundant Array of Independent or Inexpensive Disks) parity schemes may be utilized to provide error detection during the transfer and retrieval of data across a storage system. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact. RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

SUMMARY OF THE INVENTION

A method is used in balancing I/O load on data storage systems. A slice is selected from a first storage container of a storage tier. The storage tier includes a second storage container. The slice is relocated from the first storage container of the storage tier to the second storage container of the storage tier, where I/O load of the first storage container is greater than I/O load of the second storage container.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
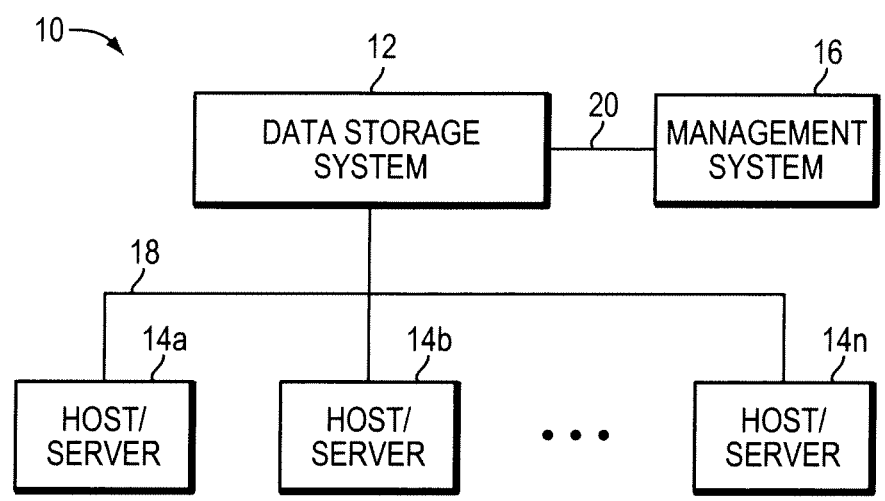
FIG. 1 is an example of an embodiment of a computer system that may utilize the techniques described herein.

Described below is a technique for use in balancing I/O load in data storage systems, which technique may be used to provide, among other things, relocating slices from one storage container of a storage tier to another storage container of the storage tier based on I/O loads of the storage containers of the storage tier.

Slice relocation is a process of determining optimal or near optimal data placement among storage objects (e.g., storage tier, storage container) based on I/O load of the storage objects. Slice relocation helps provide a way to determine respective preferable or best storage locations of data slices within a LUN in a storage pool, and to construct a slice relocation candidate list to move slices from their current locations to the respective preferable or best locations. Data migration (herein also referred to as a "data relocation"), i.e., the moving of data from one storage element to another, may be performed at the LUN level or at the slice level. Data migration moves data from one storage element to another based on a slice relocation candidate list constructed in a memory module of a data storage system by slice relocation. Data migration at the slice level may be performed by copying the data of a slice and then updating an address map with the new location of the slice.

A storage pool may be a collection of disks, which may include disks of different types. Storage pools may further be subdivided into slices; for example a 1 GB slice may be the allocation element for a logical unit. As well, a pool may be use synonymously with a storage tier. That is, both a storage tier and a pool may have storage devices of different performance capabilities and costs. As well, both may contain slices (also referred to as "data slices"). A slice may be considered the smallest element that can be tracked and moved. It may be advantageous to store the hot or most accessed data on the devices within the storage pool with the best performance characteristics while storing the cold or least accessed data on the devices that have slower performance characteristics. This can lead to a lower cost system having both faster and slower devices that can emulate the performance of a more expensive system having only faster storage devices.

A disk may be a physical disk within the storage system. A LUN may be a logical unit number which is an identifier for a Logical Unit. Each slice of data may have a mapping on the location of the physical drive where it starts and ends; a slice may be sliced again.

Slices are allocated to LUNs in a storage pool as "best-fit" at initial allocation time. In at least some cases, since the I/O load pattern of a slice is not known at initial allocation time, conventionally the performance capability of slice storage allocated may be too high or too low for effective data access on a slice. Furthermore, a data access pattern tends to change over time. Older data is accessed less frequently and therefore in at least many cases does not require storage with higher performance capability. Temperature of each storage slice is an indication of hotness of a slice, in other words, frequency and recency of slice I/Os. Better overall system performance can be achieved by placing hot slices to higher tier and cold slices to lower tier.

In at least one storage system implementation as described below, overall system performance may be increased further by balancing I/O load within a storage pool by placing hot slices of the storage pool to disk drives of the storage pool having higher performance capabilities and by placing cold slices of the storage pool to disk drives of the storage pool having lower performance capabilities.

A storage tier or a storage pool may be a collection of storage containers. A storage container may be a unit of storage including a set of storage extents. A storage extent is a logical contiguous area of storage reserved for a user requesting the storage space. For example, a storage tier may include three storage containers, each storage container including a set of disks and the set of disk in each storage container having different RAID levels.

A tiered storage system, as described above, moves data from one storage tier to another storage tier to improve overall performance of the storage system. However, despite the improvement in overall performance of the storage system, a challenge remains to track utilization of different kinds of disks within a storage tier for balancing I/O load efficiently among different kinds of disks within the tier.

Conventionally, slice relocation evaluates I/O load of each storage tier of a data storage system, and based on the evaluation optimizes overall system performance of the data storage system by moving hotter slices to a higher tier, and colder slices to a lower tier. However, in such a conventional system, slice relocation does not take into consideration I/O load of every storage container of each storage tier of the data storage system. Thus, in such a conventional system, slice relocation cannot balance I/O load across storage containers of a storage tier. As a result, conventionally in such a case, I/O load may be unevenly distributed across storage containers of the storage tier, which in turns, may cause excessive I/O load on some storage containers of the storage tier and may cause under utilization of other storage containers of the storage tier. Hence, conventionally in such a system, uneven distribution of I/O load within a storage tier may result in overall performance degradation of the data storage system.

By contrast, in at least some implementations in accordance with the technique as described herein, evaluating performance, total capacity, and I/O load of every storage container of a storage tier and based on the evaluation, moving data slices from a storage container of the storage tier having higher utilization to a storage container of the storage tier having lower utilization enables each storage container of the storage tier to achieve equal or close to equal utilization.

In at least some implementations in accordance with the technique as described herein, the use of the balancing I/O load in data storage systems technique can provide one or more of the following advantages: lowering storage costs by improving efficiency of the data storage system, improving I/O performance by distributing I/O load optimally or nearly optimally across storage containers of the storage tier, and reducing the amount of storage required in the data storage system by optimally or nearly optimally utilizing every storage container of the storage tier and by improving overall performance of the storage tier.

In at least one implementation as described below, the current technique may be used to help provide a method of determining optimal or near optimal data placement among storage containers of a storage tier based on I/O load of each storage container of the storage tier, which method helps provide a way to determine respective preferable or best storage locations of data slices within a storage tier, and to construct a temporary slice relocation list to move slices from their current locations to the respective preferable or best locations within the storage tier.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like. The dynamic aspects of performance characteristics may include, for example, aspects related to current I/O performance such as AST (average service time) representing the average amount of time it takes to service an event (e.g., service an I/O request), ART (average response time) based on the AST, and the average amount of time the I/O request waits. Dynamic aspects may also include, for example, utilization of different data storage system resources (e.g., particular logical or physical devices, CPU), measurement of cache hits and/or misses, and the like. The dynamic aspects may vary with application workload, such as when particular applications may be more heavily performing I/O operations.

Given the different performance characteristics, one or more tiers of storage devices may be defined. The physical devices may be partitioned into tiers based on the performance characteristics of the devices; grouping similar performing devices together. An embodiment using the techniques herein may define a hierarchy of multiple tiers. Conversely, the particular performance characteristics may be applied to a storage pool with or without the definition of tiers. The set of resources associated with or designated for use by a tier or grouping within a pool may be characterized as a dynamic binding in that the particular set of data storage system resources utilized by consumers in a tier may vary from time to time. A current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system may vary at different points in time.

An Auto-Tiering policy engine (PE) of the data storage system 12 examines a storage pool's storage configuration and temperatures of all slices in that storage pool, and generates a slice relocation list. The slice relocation list identifies slices to be relocated with respective destination information. In general, slices in a storage pool are matched to the most appropriate respective tiers based on their respective temperatures (e.g., hot, cold) and tier preferences (e.g., High, Low, Optimal). If a slice's current tier differs from its matching tier, the slice is listed in the relocation candidate list.

Figure 2:
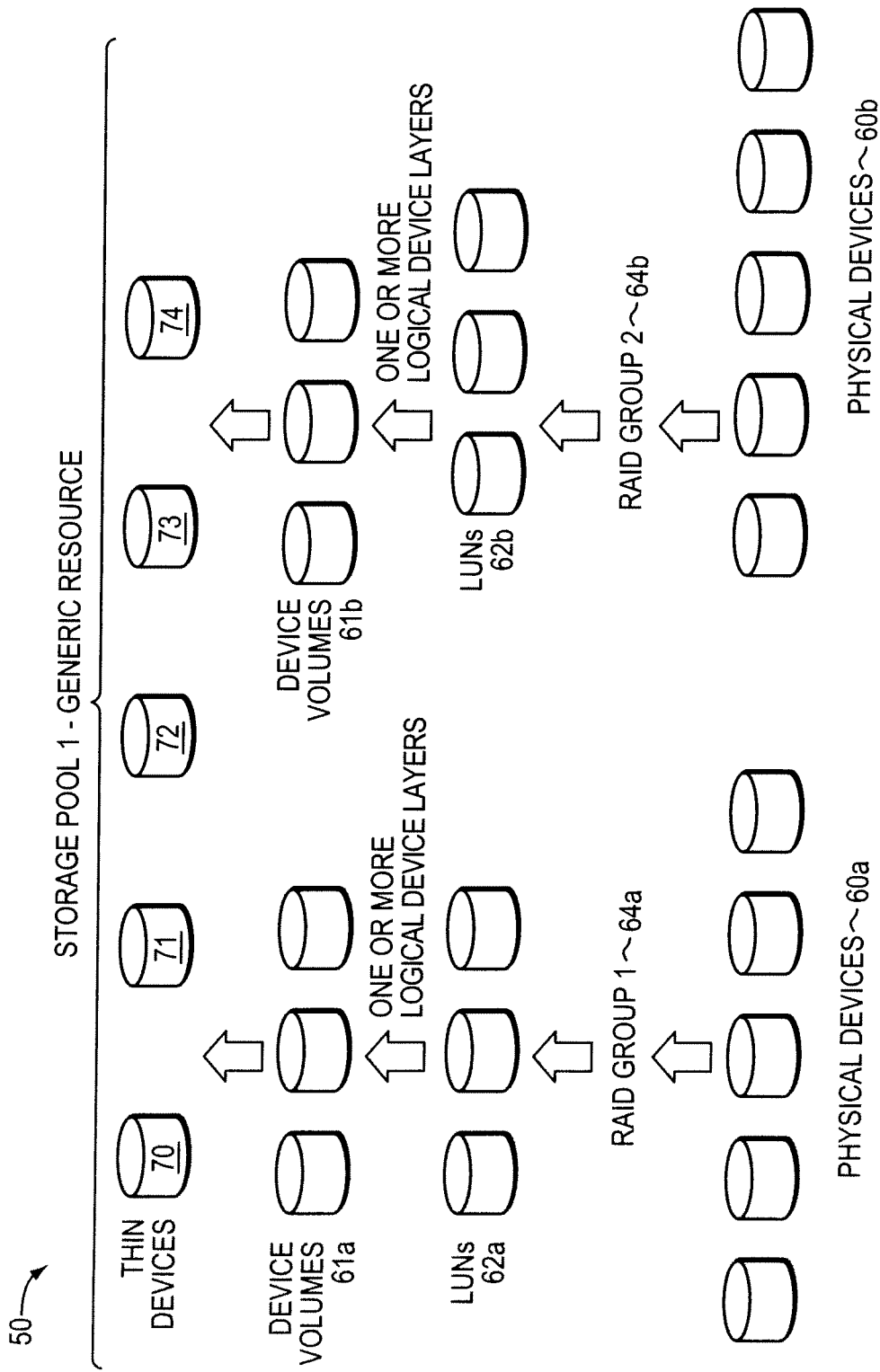
FIG. 2 is an example representation of how storage pools may be configured from physical devices in an embodiment.

Referring to FIG. 2, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more thin devices 70-74. A thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices such as device volumes 61a-61b, which are logical devices that map logical storage space of the data device to physical storage space on the physical devices 60a-60b. Thus, an access of the logical storage space of the thin device results in either a null pointer (or equivalent) indicating that no corresponding physical storage space has yet been allocated, or results in a reference to a data device which in turn references the underlying physical storage space.

Figure 3:
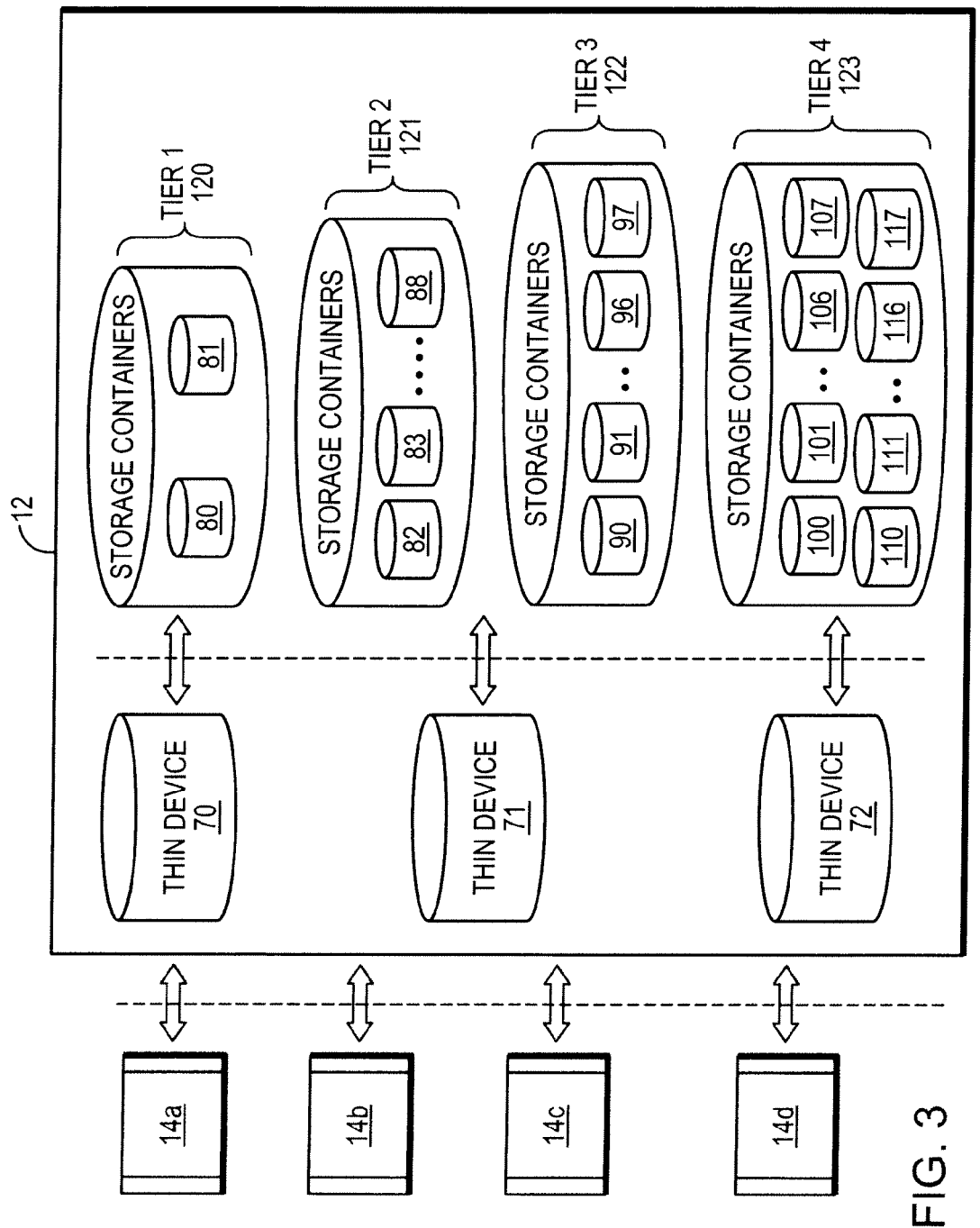
FIG. 3 is an illustration showing a fine grained tiered storage system according to an embodiment of the computer system described herein.

The data storage system best practices may define how to configure or form the generic storage pools, each storage pool having an associated generic storage pool type. FIG. 3 illustrates one methodology or framework that may be used to form storage pools in an embodiment. In an embodiment following the methodology of FIG. 3, each underlying data storage system may have associated best practices specifying how to configure storage pools formed from physical devices in that particular data storage system. For example, different data storage systems may have varying best practices in connection with forming an auto-tiering storage pool. A storage extent may be formed or configured from one or more LUNs 62a-b.

FIG. 3 is an illustration of a tiered data storage system 12 according to an embodiment of the system described herein. As illustrated, data storage system 12 includes multiple thin devices 70-72 and multiple pools of storage in multiple storage tiers 120-123. Host applications 14a-14d and/or other entities (e.g., other storage devices, SAN switches, etc.) request data writes and data reads to and from the data storage system 12. Thin devices 70-72 may appear to a host coupled to the storage system 12 as a logical volume (logical device) containing a contiguous block of data storage, as discussed herein. Each thin device 70-72 may correspond to a particular data device, a portion thereof and/or multiple data devices. Accordingly, each thin device 70-72 may map to storage areas across multiple storage tiers. As a result, although each thin device 70-72 may appear as containing a logically contiguous block of storage, each thin device 70-72 may allow for blocks of data to be transparently stored (and/or retrieved) from discontiguous storage pools made up of the varying classes of data storage devices. In various embodiments, multiple host applications 14a-14d may share a single one of thin devices 70-72 and/or multiple thin devices 70-72 may be mapped to the same set of storage pools 120-123.

In at least some embodiments of the current technique, a storage tier may include one or more storage containers. A storage container may be associated with data devices, such as the physical devices 60a-60b discussed herein, so that, for example, there is one or more data devices for each storage container, one data device for multiple storage containers, any portion of a data device for any portion of the pools of storage for a storage container, and/or any combinations thereof. Further, data devices associated with a storage container may have different characteristics, such as speed, cost, reliability, availability, security and/or other characteristics.

Referring back to FIG. 3, a top tier storage pool 120 (e.g., tier 1) may include storage containers 80-81 having flash/solid state disk (SSD) drives that are relatively fast and expensive. Other storage pools 121-123 (e.g., tiers 2-4) may include storage containers associated with disk drives of decreasing speeds or other configurations (i.e., 15 k rpm, 10 k rpm, 7.5 k rpm redundant array of independent disk (RAID) storage). Storage pool 121 (e.g., tier 2) may include storage containers 82, 83, 88 having disk drives with different RAID levels. Similarly, storage pool 122 (e.g., tier 3) may include storage containers 90, 91, 96, 97 having disk drives with different RAID levels. The lowest tier of storage pool 123 (e.g., tier 4) may include, for example, storage containers 100, 101, 106, 107, 110, 111, 116, 117 having tape storage and largest capacity disk drives (such as massive array of idle disks (MAID) storage). Further, the last storage tier 123 may also include storage devices external to the data storage system 12 that may be suitable for long term storage of data that is infrequently accessed.

Figure 4:
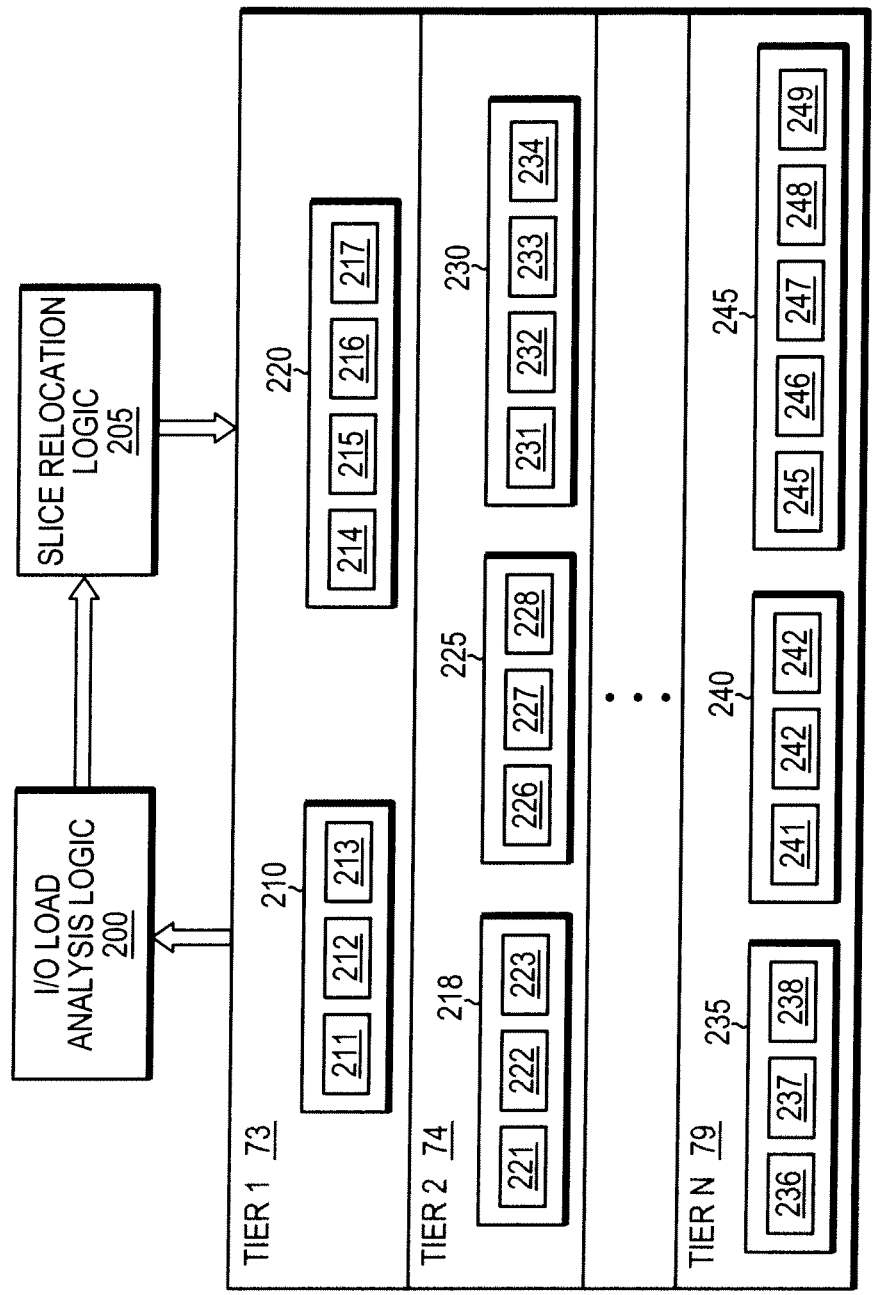
FIG. 4 is a diagram illustrating in more detail components that may be used in connection with techniques herein.

Referring to FIG. 4, shown is a more detailed representation of components that may be included in an embodiment using the techniques described herein. Slice relocation logic 205 focuses on shifting hot data slices to upper tiers and cold slices down to lower tiers. The goal is to put hot, frequently accessed data slices to higher tier and maximize the utilization of these high tiers, which include faster but more expensive drives. Data storage system 12 tries to fully utilize the high tier with hot data slices first, until either the capacity limit or the temperature limit of the tier is reached before going to the next lower tier.

In at least some implementations in accordance with the technique as described herein, slice relocation within a storage tier focuses on moving data slices between storage containers (e.g., RAID groups) of the storage tier so that I/O activities can be balanced across every storage container of the storage tier. In that sense, a goal of I/O load analysis logic 200 is to distribute data slices to storage containers within a storage tier in such a way that the ratio of storage utilization of each storage container of the storage tier is equivalent or roughly equivalent. The properties and storage capabilities of the storage containers belonging to the storage tier may differ or vary from storage container to storage container. For example, a first set of storage containers may have faster response times and higher IOPS than a second set of storage containers even though both sets belong to the same storage tier.

I/O load analysis logic 200 tracks storage capability and I/O load of every storage container of a storage tier in data storage system 12. For example, in FIG. 4, data storage system 12 includes storage tiers 73, 74, 79 (e.g., tier 1, tier 2, tier n). Storage tier-1 73 includes storage containers 210, 220. Storage container 210 includes data slices 211-213. Storage container 220 includes data slices 214-217. Similarly, storage tier-2 74 includes storage containers 218, 225, 230. Storage container 218 includes data slices 221-223, storage container 225 includes data slices 226-228 and storage container 230 includes data slices 231-234. Similarly, storage tier-n 79 includes storage containers 235, 240, 245. Storage container 235 includes data slices 236-238, storage container 240 includes data slices 241-243 and storage container 245 includes data slices 245-249. Based on evaluation of I/O load of a storage container of a storage tier, data slices are relocated by slice relocation logic 205 from one storage container of a storage tier to another storage container of the storage tier in an effort to evenly distribute I/O load across storage containers of the storage tier. In at least one embodiment in accordance with the current technique as described herein, I/O load analysis logic 200 computes information such as storage capability, current I/O load, and desired I/O load of every storage container of a storage tier in data storage system 12 by using data structures representing slices of storage containers of a storage tier in a memory module of data storage system 12. Slice relocation logic 305 then moves slices from one storage container to another storage container in a storage tier based on analysis of the computed information by I/O load analysis logic 200. Data relocation may then be performed by copying the data of a slice relocated from one storage container to another storage container in the storage tier and by updating an address map of the slice with the new location of the slice.

Figure 5:
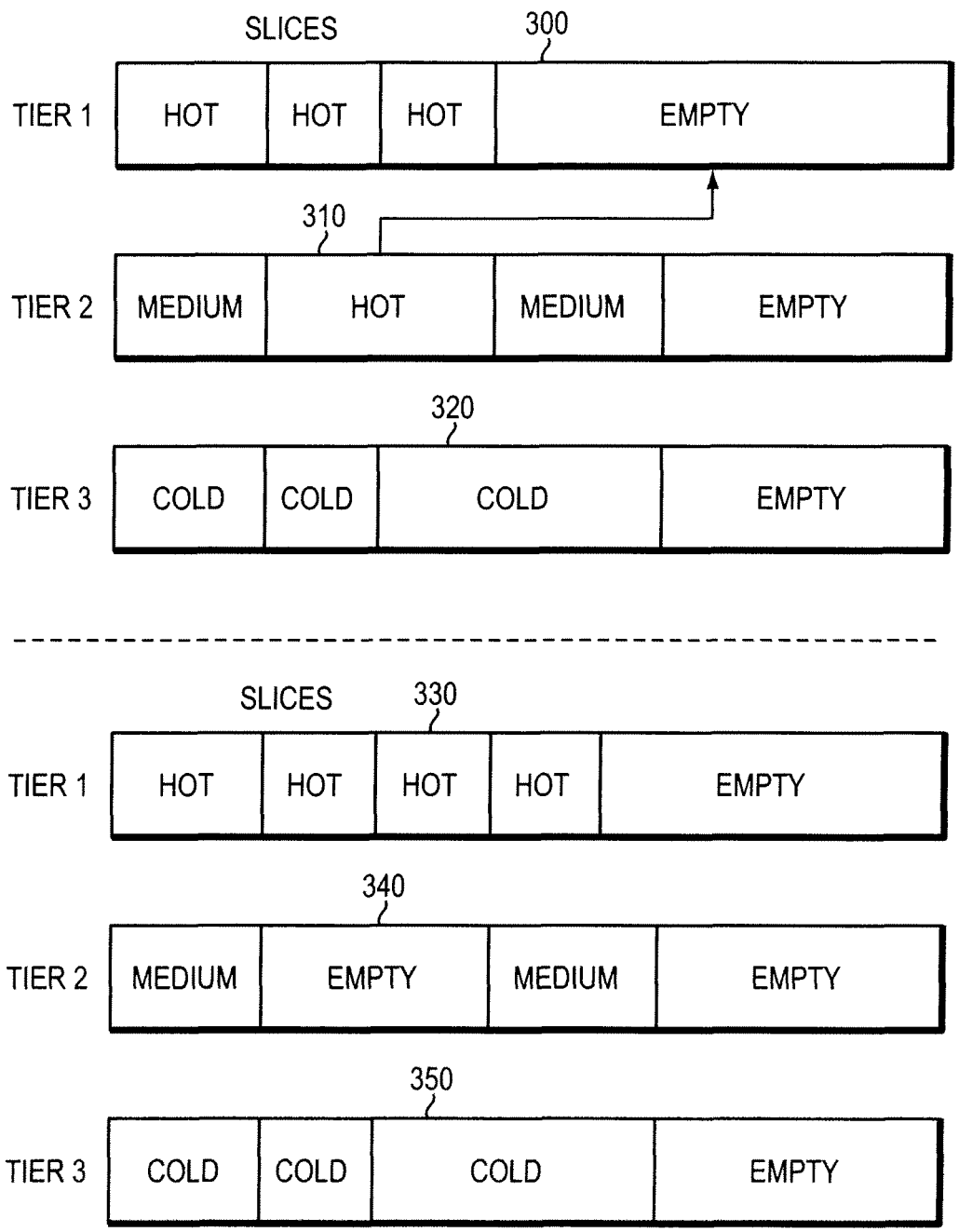
FIGS. 5-6 are diagrams illustrating an example representation of relocation of slices that may be used in connection with techniques herein.

Referring now to FIG. 5 that illustrates a process of relocating data slices from a first storage tier to a second storage tier in a data storage system. In this figure, there are three storage tiers, Tier 1, Tier 2 and Tier 3. Each storage tier includes slices, such as slices 300, 310, and 320. As well, each slice has a temperature associated with it such as hot, cold, or medium. As well, some of the storage tier is also considered empty. Referring to the upper portion of the FIG. 5, there is a hot slice 310 in storage Tier 2. The temperature of a slice may be designated as a scalar or step value that is it may have a numerical equivalent such as 30 degrees or may simply be designated into a bucket, such as cold.

Also shown in the FIG. 5 is that Tier 1 has empty space 300. In this example, Tier 1 may have faster performance characteristics and a higher cost. Conversely, Tier 2 may have slower performance characteristics but a lower cost. This may be seen, for example, in the fact that there is more storage in Tier 2 than there is in Tier 1. Again, in the upper portion of the FIG. 5, it is shown that there is a hot slice 310 in Tier 2 that should be moved to Tier 1. In this example embodiment, as shown in the lower portion of FIG. 5, the hot slice is moved to Tier 1 leaving an empty space 340 in Tier 2.

Figure 6:
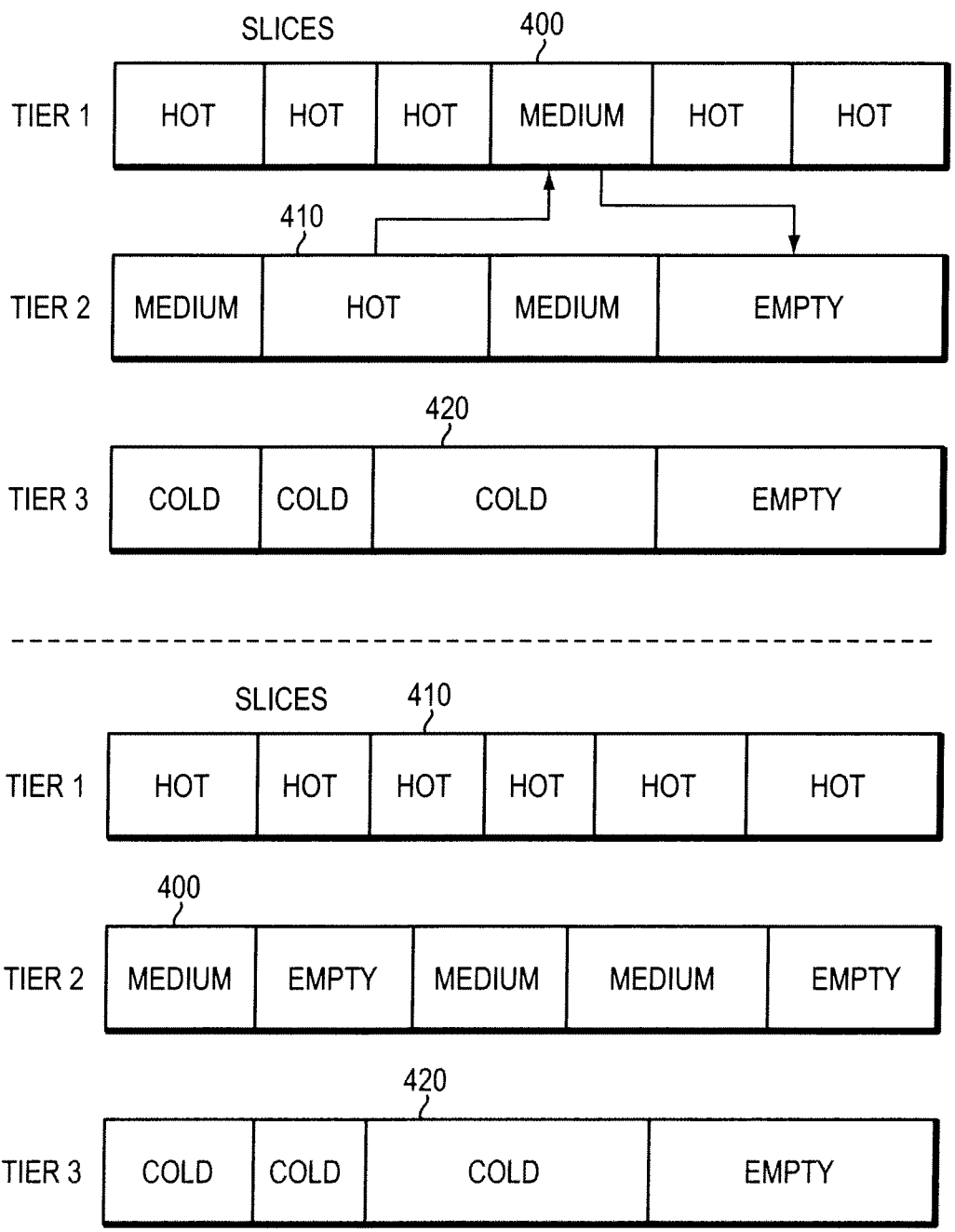

Referring now to FIG. 6 that illustrates a process of relocating data slices from a first storage tier to a second storage tier in a data storage system. In this embodiment, there is a hot slice 410 in Tier 2 and a medium slice 400 in Tier 1; however, Tier 1 has no space to accommodate an additional tier. Therefore, in this embodiment, the medium slice 400 on Tier 1 is migrated to Tier 2 and the hot slice 410 in Tier 2 is migrated to Tier 1. Note, that it was the need to migrate the hot slice 410 to Tier 1 that caused the medium slice 400 to be shifted to Tier 2. In this example, it may have been more effective to have the medium slice located in Tier 1. Also note that slices may change temperature based on data access requests. Therefore, a slice's temperature may rise or fall over time. The slice's temperature may be the result of any number of calculations based on data access or data write requests to that slice.

Referring to FIG. 7-10, shown is an illustration of I/O load balancing among storage containers of a storage tier in a data storage system. In at least some implementations in accordance with the technique as described herein, I/O load is balanced in a data storage system by distributing data slices across storage containers of a storage tier in such a way that the storage utilization of each storage container of the storage tier is equivalent or close to equivalent. The formula to calculate storage utilization of a storage container is:

$$\text{Storage utilization} = (\text{I/O load})/(\text{Storage capability})$$

Where

I/O load: A computed value indicating the current frequency and recency of slice I/Os in a storage container.

Storage capability: Maximum I/O load of a storage container.

I/O activity of a slice is an indicator of current I/O load of the slice. Slice I/O activity is computed using raw slice statistics. The computation may be done in any of several different ways. The specific computation to use may depend on the system I/O traffic pattern. In at least some cases, the simplest and most straightforward calculation is to use total slice I/O counts as I/O activity, such that the slice I/O load is the moving average of slice I/O counts. The storage capability of a storage container indicates how much I/O load the storage container may take while maintaining high, optimal or near optimal performance. The storage capability of a storage container is based on the storage performance characteristics, such as disk drive type, drive performance, RAID group type, and number of disks in the storage container.

With reference also to FIG. 4, I/O load analysis logic 200 uses a data structure, dataset, for evaluating I/O load of a storage container and relocating slices to and from the storage container. A dataset is an object associated with one or more rules for analyzing I/O load of a storage container. A dataset represents an object containing items of a same kind. For example, a data set may represent a RAID group containing data slices. A dataset may also represent a storage tier containing data slices. The properties of a dataset object include number of items that are stored in the dataset, capacity of the dataset, value of the dataset, and capability of the dataset. The capacity of a dataset indicates a maximum number of items that may be stored in the dataset. The value of a dataset indicates total value of all items in the dataset. Every item in a dataset is associated with certain value. For example, value of a data slice is I/O load of the data slice and value of a RAID group is the normalized total I/O load of the RAID group which is computed by adding I/O load of every data slice in the RAID group. The capability of a dataset indicates maximum value of the dataset. The value of a dataset is equivalent or lower than the capability of the dataset.

A storage tier may include one or more storage containers with similar storage characteristics (such as drive types) but different storage capabilities (such as RAID group type, number of disks). Generally, data is randomly allocated across storage containers in a storage tier. As a result of such random allocation, some storage containers with low storage capability may be overloaded with a large number of I/Os while some storage containers with high storage capability may be underutilized with fewer I/Os. In at least one embodiment in accordance with the current invention, I/O load of a storage container is balanced according to the storage capability of the storage container.

Figure 7:
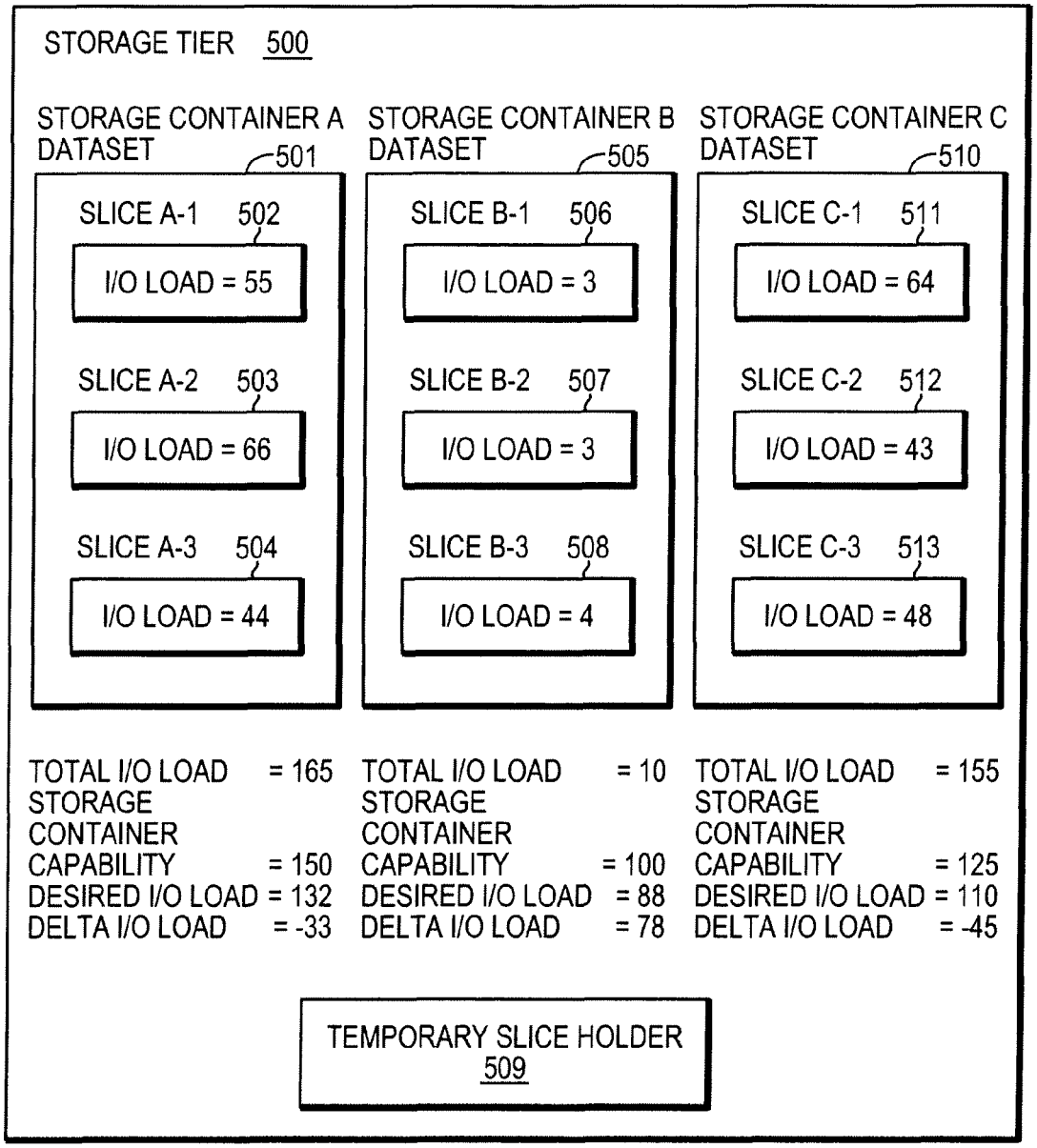
FIGS. 7-10 are diagrams illustrating an example of an embodiment of the current techniques applied to storage tiers.

Referring to FIG. 7, shown is an illustration of I/O load balancing in a storage tier that may be included in an embodiment using the techniques described herein. Storage tier 500 contains three storage containers 501, 505, 510. The storage utilization ratio for the storage tier 500 is computed by dividing the total I/O load of the storage container 500 with the total storage capability of the storage container 500. For example, in FIG. 7, the total I/O load for the storage tier 500 is computed by adding I/O load of each storage container of the storage tier 500. Storage container A 501 includes slice A-1 502 with I/O load as 55, slice A-2 503 with I/O load as 66, and slice A-3 504 with I/O load as 44. Thus, the total I/O load of storage container A 501 is 165. Storage container B 506 includes slice B-1 506 with I/O load as 3, slice B-2 507 with I/O load as 3, and slice B-3 508 with I/O load as 4. Thus, the total I/O load of storage container B 506 is 10. Storage container C 510 includes slice C-1 511 with I/O load as 64, slice C-2 512 with I/O load as 43, and slice C-3 513 with I/O load as 48. Thus, the total I/O load of storage container C 510 is 155. Hence, the total I/O load of the storage tier 500 is 330 which is computed by adding the total I/O load of every storage container (e.g. A 501, B 505 and C 510) of the storage tier 500. The total storage capability of the storage tier 500 is computed by adding the storage capability of each storage container of the storage tier 500. For example, in FIG. 7, the storage capability of storage container A 501 is 150, the storage capability of storage container B 505 is 100, and the storage capability of storage container C 510 is 125. Thus, the total storage capability of the storage tier 500 is 375. The storage utilization ratio of the storage tier 500 in this example is 0.88 which is computed by dividing the total I/O load ("330") with the total storage capability ("375"). A dataset object is created in the data storage system's memory for each storage container of the storage tier 500 for balancing I/O load of the storage tier 500.

A desired I/O load is then computed for each storage container of the storage tier 500. The desired I/O load helps determine list of slices that are candidate for relocation. A temporary slice holder object 509 is created to temporarily hold slices that are candidate for relocation from one storage container of a storage tier to another storage container of the storage tier. The desired I/O load for a storage container is computed by multiplying the storage utilization ratio of the storage tier with the storage capability of the storage container. For example, in FIG. 7, the desired I/O load for a dataset object associated with storage container A 501 is 132 which is computed by multiplying the storage utilization ratio of storage tier 500 ("0.88") with the storage capability of storage container A 501 ("150"). Similarly, the desired I/O load for a dataset object associated with storage container B 505 is 88 which is computed by multiplying the storage utilization ratio of storage tier 500 ("0.88") with the storage capability of storage container B 505 ("100"). The desired I/O load for a dataset object associated with storage container C 510 is 110 which is computed by multiplying the storage utilization ratio of storage tier 500 ("0.88") with the storage capability of storage container C 510 ("125").

Figure 8:
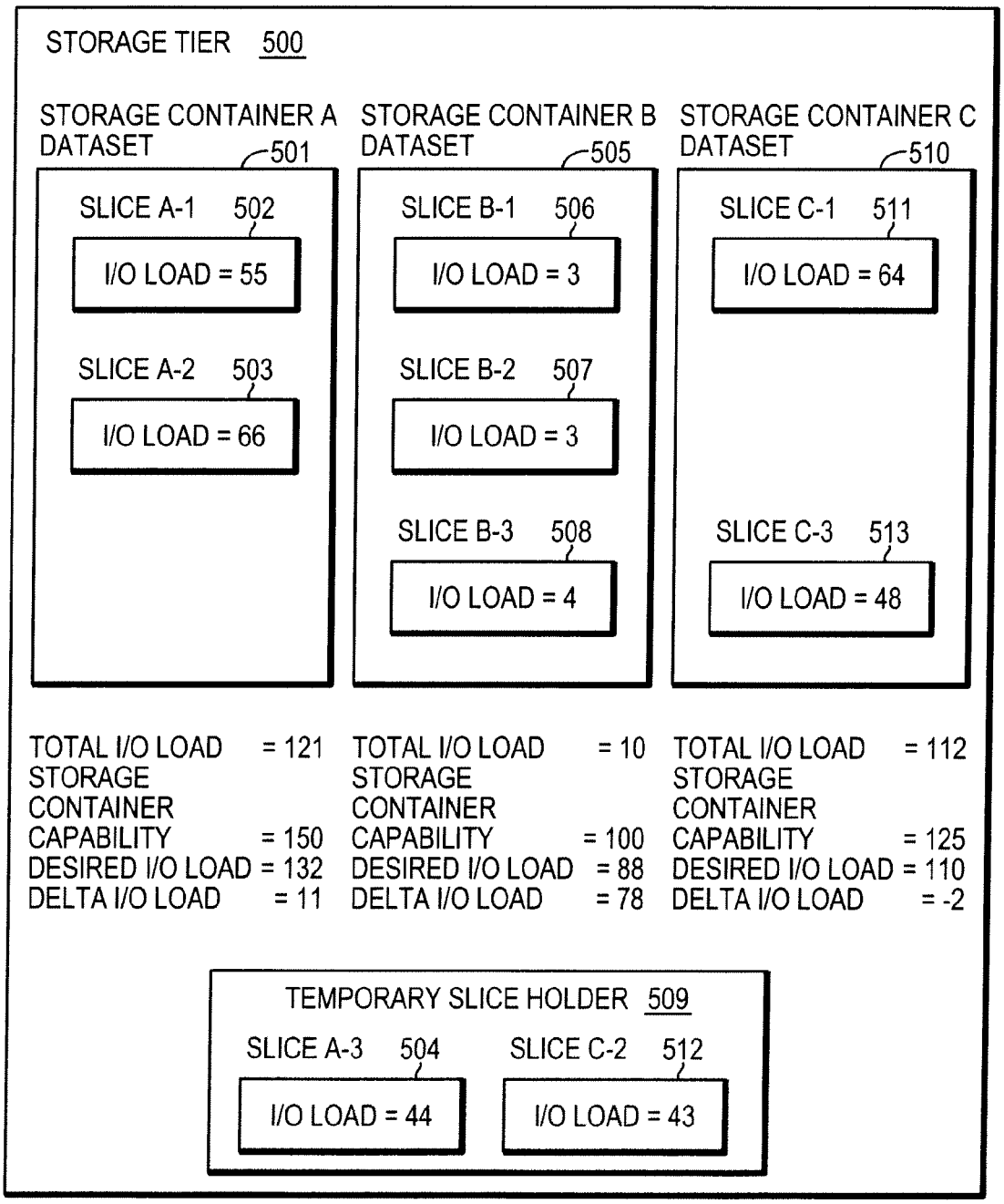

Referring to FIG. 8, shown is an illustration of I/O load balancing in a storage tier that may be included in an embodiment using the techniques described herein. After the desired I/O load for each storage container of the storage tier 500 is computed, a delta I/O load is computed for each storage container of the storage tier 500. The delta I/O load for a storage container is a difference in value between the desired I/O load of the storage container and the total I/O load of the storage container. A positive delta I/O load for a storage container indicates that the storage container is under utilized and can accept more I/O load by relocation of one or more slices to the storage container. A negative delta I/O load for a storage container indicates that the storage container is over utilized and I/O load of the storage container is balanced by relocating one or more slices from the storage container to another storage container of the storage tier. For example, in FIG. 8, with reference also to FIG. 7, the delta I/O load for the storage container A 501 is 11 (132-165), the delta I/O load for the storage container B 505 is 78 (88-10), and the delta I/O load for the storage container C 510 is −2 (110-155).

In at least some implementations in accordance with the technique as described herein, if the total I/O load of the storage container is more than the desired I/O load of the storage container (a "negative delta I/O load" situation), one or more data slices of the storage container may be relocated from the storage container to the temporary slice holder 509. The goal of relocating data slices from a storage container of a storage tier to another storage container of the storage tier is to balance the total I/O load of the storage container in such a way that the total I/O load of the storage container is equivalent or close to equivalent to the desired I/O load of the storage container. Slices are selected for relocation in such a way that minimizes the number of transfers that are required to achieve optimal or near optimal I/O load across every storage containers of a storage tier. Hence, to balance I/O load in a storage container, a data slice of the storage container which has I/O load that is closer in value to the delta I/O load of the storage container is selected for relocation. For example, in FIG. 8, the total I/O load of storage container A 501 is greater than the desired I/O load of storage container A 501. Therefore, slice A-3 504 which has I/O load as 44 is moved from storage container A 501 to the temporary slice holder 509 because I/O load of slice A-3 504 is closer in value to the delta I/O load compared to I/O load of every other slice in the storage container A 501 (e.g., slice A-1 502 with I/O load as 55 and slice A-2 503 with I/O load as 66). Next, the total I/O load of storage container B 505 is not more than the delta I/O load of storage container B 505, thus, no slice relocation is needed in storage container B 505. Next, the total I/O load of storage container C 510 is greater than the desired I/O load of storage container C 510. Therefore, slice C-2 512 which has I/O load as 43 is moved from storage container C 510 to the temporary slice holder 509 because I/O load of slice C-2 512 is closer in value to the delta I/O load compared to I/O load of every other slice in the storage container C 510 (e.g., slice C-1 511 with I/O load as 64 and slice C-3 513 with I/O load as 48).

Figure 9:
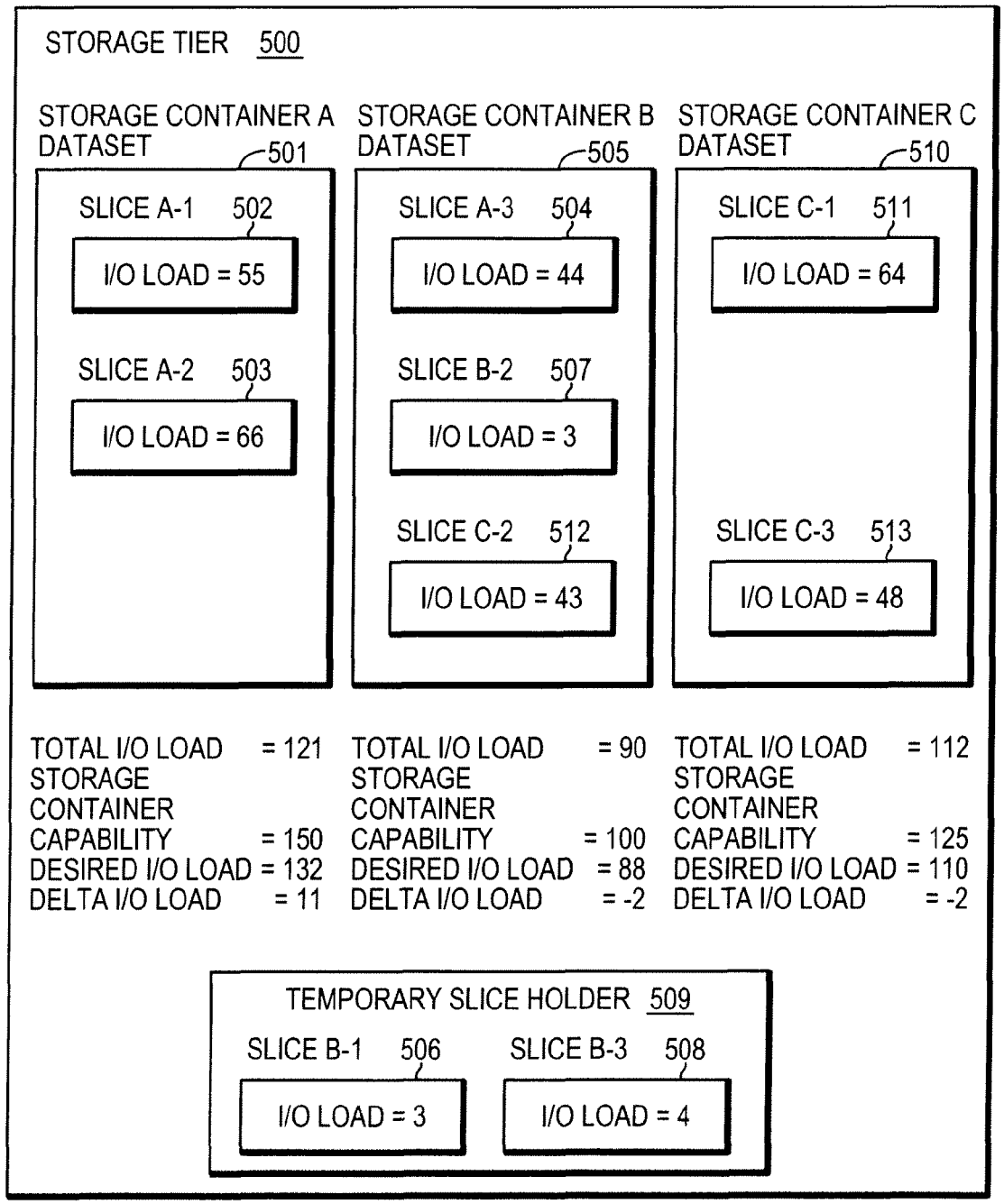
Figure 10:
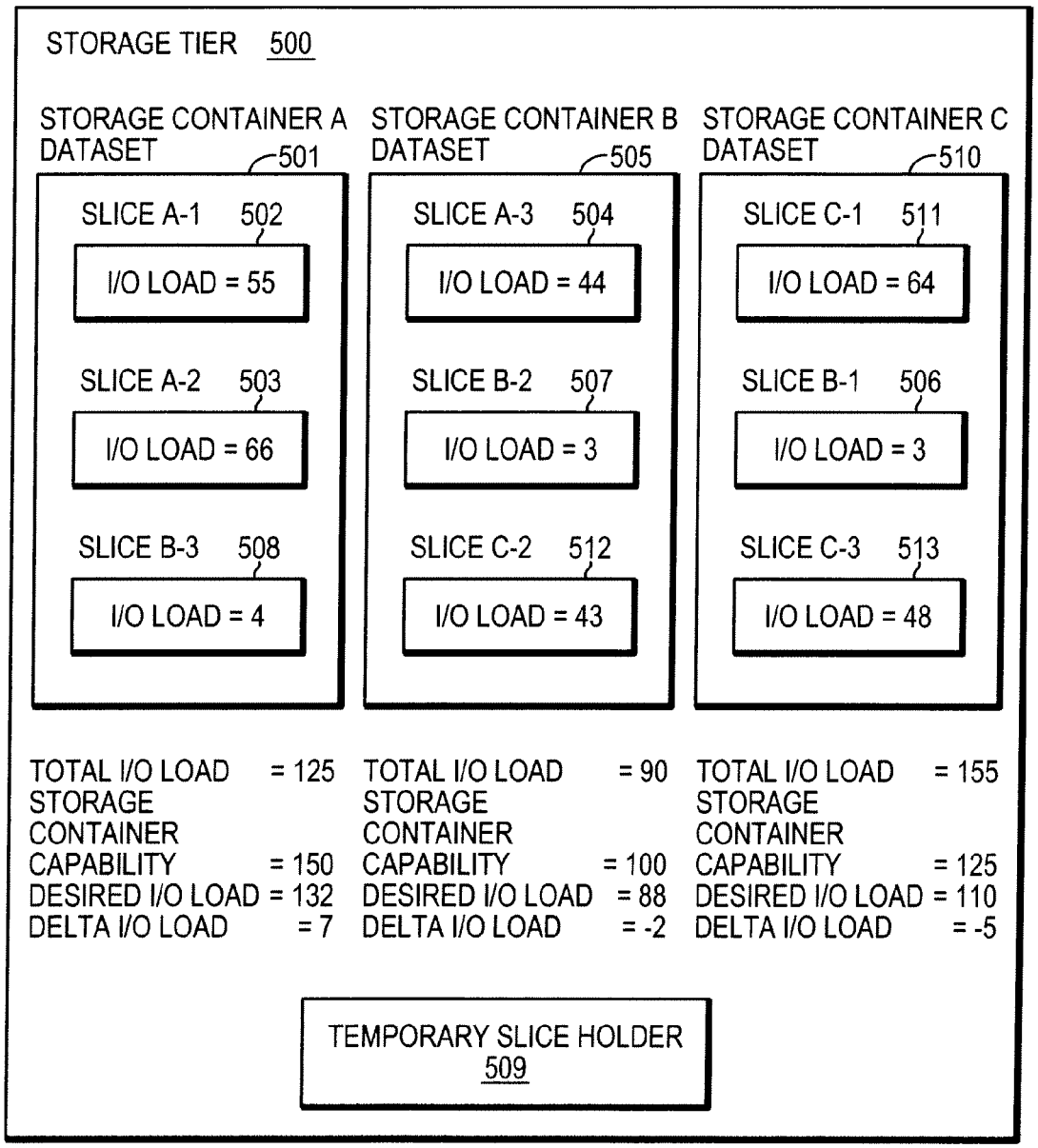

Referring to FIG. 9, shown is an illustration of I/O load balancing in a storage tier that may be included in an embodiment using the techniques described herein. After relocating slices from a storage container to temporary slice holder 509, the delta I/O load is recomputed for each storage container of the storage tier 500. Then, for each storage container of the storage tier, I/O load of a storage container is evaluated by comparing the total I/O load of the storage container with the desired I/O load of the storage container. If the total I/O load of the storage container is less than the desired I/O load of the storage container, slices are relocated from the temporary slice holder 509 to the storage container. For example, in FIG. 9, with reference also to FIG. 8, the total I/O load of storage container A 501 is close to equivalent to the desired I/O load of the storage container A 501; thus, no slice relocation is required for this storage container. Next, the total I/O load of storage container B 505 is significantly less than the desired I/O load of the storage container B 505. As a result, storage container B 505 can accommodate additional I/O load. Slices are selected for relocation to storage container B 505 from temporary slice holder 509 in such a way that the gap between the desired I/O load of the storage container B 505 and the total I/O load of the storage container B 505 closes and becomes as close to value zero as possible. Balancing I/O load in a storage container in such a way may result in exchange of one or more slices from the storage container to the temporary slice holder 509. For example, in FIG. 9, to increase the total I/O load of storage container B 505, slices A-3 504 and C-2 512 are moved from temporary slice holder 509 to the storage container B 505, and slices B-1 506 and B-3 508 are moved from storage container B 505 to temporary slice holder 509. As a result, the total I/O load of storage container B 505 becomes 90 and the delta I/O load of the storage container B 505 becomes −2. As a result, the gap between the total I/O load and desired I/O load of the storage container B 505 closes and becomes as close to zero as possible. Next, the total I/O load of storage container C 510 is compared with the desired I/O load of storage container C 510. In this example, the total I/O load of storage container C 510 is very close in value with the desired I/O load of storage container C 510. As a result, storage container C 510 cannot accommodate any additional I/O load, and no slice relocation occurs in storage container C 510. After evaluating each storage container of the storage tier 500, if there are any slices left in the temporary slice holder object 509, data storage system 12 makes an attempt to move every slice in the temporary slice holder object 509 back to either the original storage container of the slice or any storage container that can accommodate additional I/O load. In this example, in FIG. 10, slices B-1 506 and B-3 508 in the temporary slice holder object 509 were relocated from storage container B 505. However, storage container B 505 cannot accommodate any additional I/O load because the delta I/O load of storage container B 505 is −2 which is as close to value zero as possible. Thus, slice B-3 508 is moved to storage container A 501, and slice B-1 506 is moved to storage container C 510. If required, the processing as described herein in FIGS. 7-10 may be repeated till the time when either the delta I/O load or the desired I/O load falls below a certain percentage or the value of the delta I/O load of each storage container of the storage tier 500 can not reduce further to a lower value.

Figure 11:
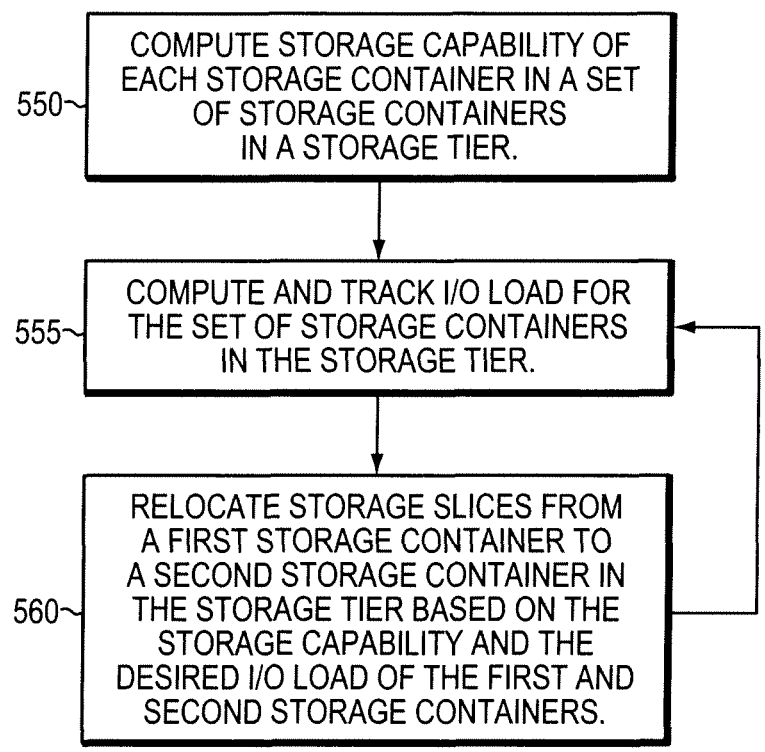
FIGS. 11-13 are flow diagrams illustrating processes that may be used in connection with techniques herein.

Referring to FIG. 11, shown is a flow diagram illustrating balancing of I/O load in a data storage system. With reference also to FIGS. 4, and 7-10, the data storage system 12 tracks I/O load of each storage container of a storage tier and balances I/O load across each storage container by relocating data slices from a storage container of the storage tier with higher storage utilization to another storage container of the storage tier with lower storage utilization. As a result, each storage container of the storage tier achieves optimal or near optimal storage utilization. First, the storage capability of each storage container of a set of storage containers of a storage tier is computed (step 550). Then, the total I/O load of each storage container of the set of storage containers of the storage tier is computed (step 555). Data storage system 12 also tracks any change in the total I/O load of a storage container as slices are relocated from one storage container of the set of storage containers of the storage tier to another storage container of the set of storage containers of the storage tier, in turns, causing a change in the total I/O load of the storage container. To balance I/O load across each storage container of the set of storage containers of the storage tier, one or more data slices are relocated from a first storage container of the set of storage containers of the storage tier to a second storage container of the set of storage containers of the storage tier based on the storage capability and the desired I/O load of each of the first and second storage containers.

Figure 12:
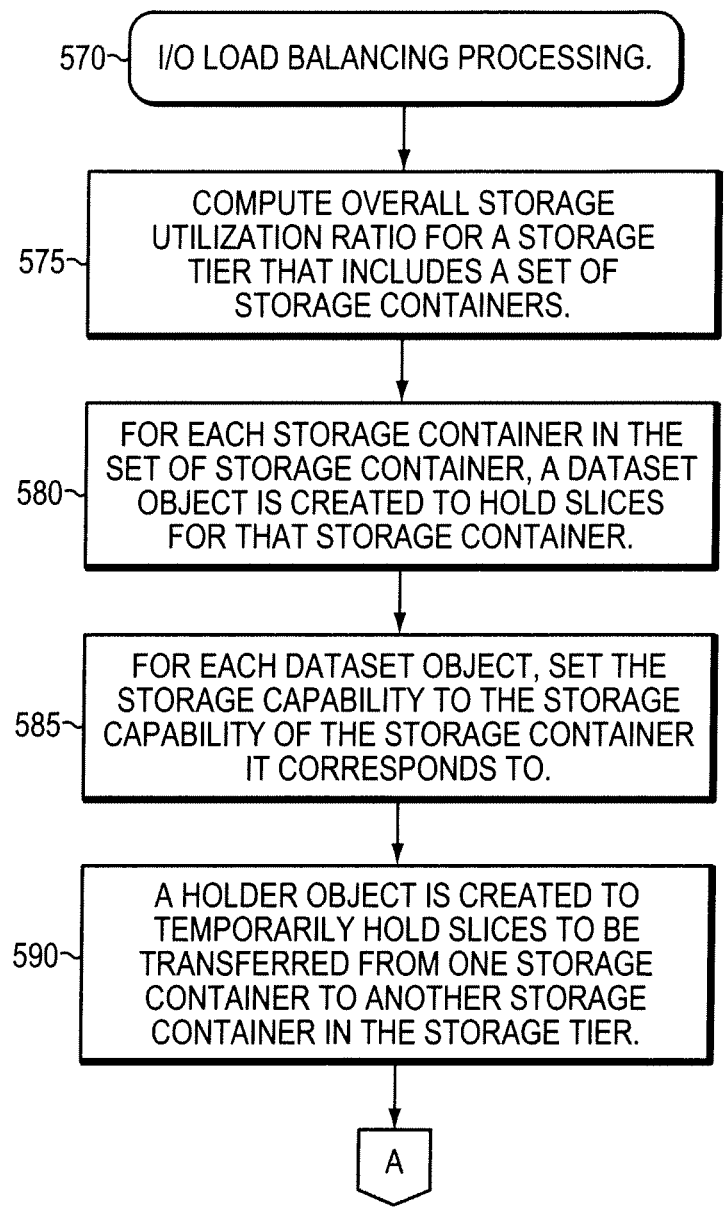

Referring to FIG. 12, shown is a more detailed flow diagram illustrating balancing of I/O load in a data storage system (step 570). The storage utilization ratio for a storage tier including a set of storage containers is computed (step 575). A dataset object is created in the data storage system's memory for each storage container of the set of storage containers in the storage tier (step 580). A dataset object holds one or more slices for a storage container. The storage capability of a dataset object is set to the storage capability of a storage container represented by the dataset object (step 585). The storage capability of each storage container of the set of storage containers of the storage tier is computed. A temporary slice holder object is created to temporarily store slices that are relocated from one storage container of the storage tier to another storage container of the storage tier (step 590).

Figure 13:
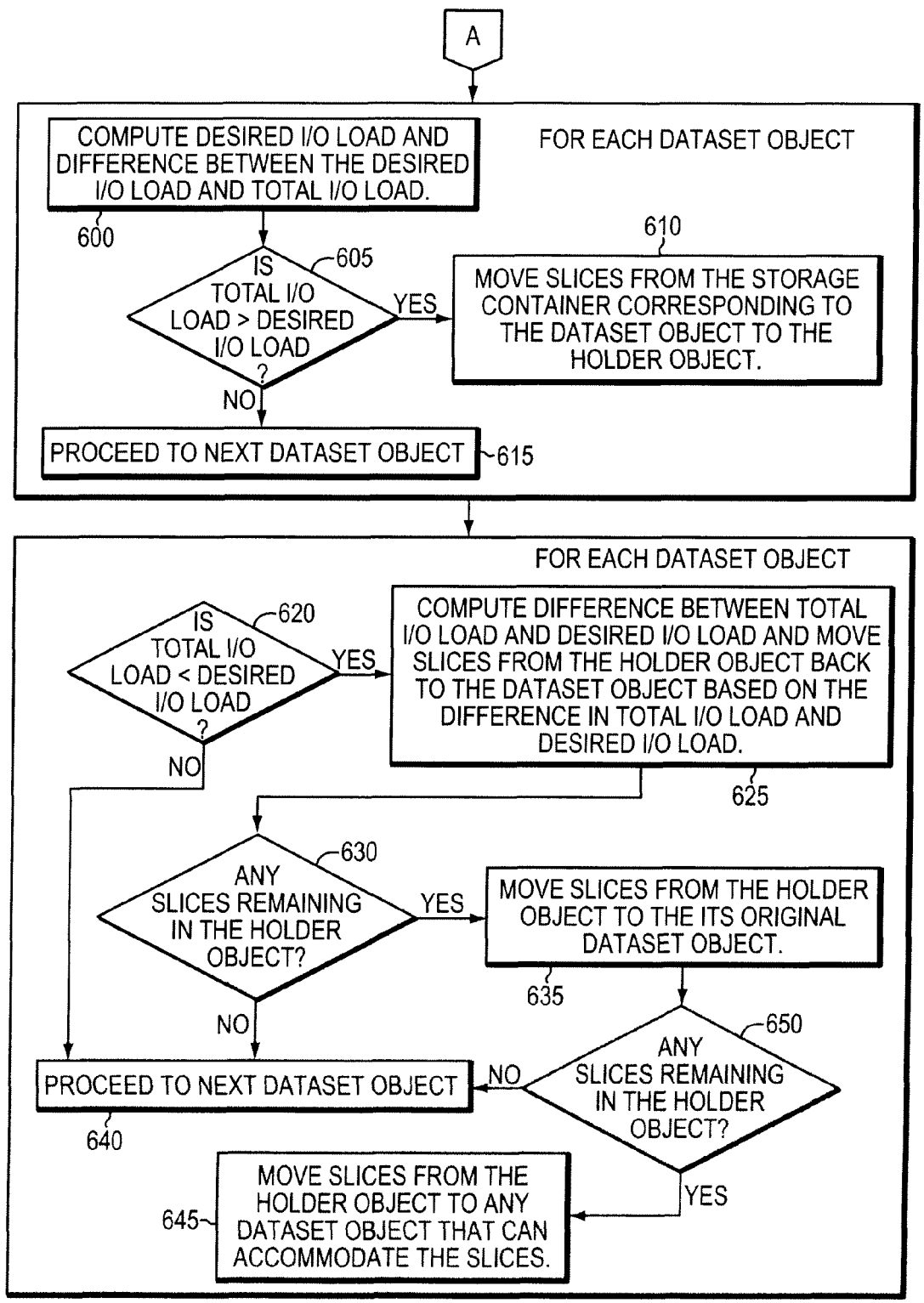

Referring to FIG. 13, shown is a more detailed flow diagram illustrating balancing of I/O load in a data storage system. For each dataset object of the set of dataset objects in the storage tier, an attempt is made to relocate one or more slices from one or more storage containers to the temporary slice holder object in order to reduce the I/O load of a storage container which is overloaded with high number of I/O. First, the desired I/O load and the total I/O load of a dataset object associated with a storage container of the storage tier is computed (step 600). Then, the desired I/O load of the dataset object is compared with the total I/O load of the dataset object (step 605). If the total I/O load of the dataset object is greater than the desired I/O load of the dataset object, one or more slices are moved from the storage container associated with the dataset object to the temporary slice holder object (step 610). Data storage system 12 proceeds to balance I/O load for next dataset object in the storage tier (step 615). This process repeats until each dataset object associated with each storage container of the set of storage containers of the storage tier has been processed.

Data storage system 12 attempts to relocate slices from the temporary slice holder object to one or more storage container of the storage tier by moving one or more slice to a storage container which is under utilized and can accommodate additional I/O load. The total I/O load of a dataset object is compared with the desired I/O load of the dataset object (step 620). If the total I/O load of the dataset object is less than the desired I/O load of the dataset object, one or more slices are moved from the temporary slice holder object to the storage container associated with the dataset object (step 625). A slice is selected for relocation to a dataset object from the temporary slice holder object based on evaluation of I/O load of the slice and difference between the total I/O load and the desired I/O of the dataset object. If one or more slices remain in the temporary slice holder object after relocating slices to storage containers (step 630), data storage system 12 attempts to move remaining slices from the temporary slice holder object to an original storage container from where slices were initially moved to the temporary slice holder object (step 635). If one or more slices cannot be moved back to the original storage container or an additional slice remains in the temporary slice holder object (step 650), remaining slices are moved from the temporary slice holder object to one or more storage containers that can accommodate additional I/O load (step 645). If no slices remain in the temporary slice holder object, data storage system 12 proceeds to balance I/O load for next dataset object in the storage tier (step 640). This process repeats until each dataset object associated with each storage container of the set of storage containers of the storage tier has been processed. In at least one embodiment, first each dataset object representing slices of a storage container of a storage tier are processed for balancing I/O load in the storage tier, and then data relocation may be performed by copying the data of a slice relocated from one storage container to another storage container in the storage tier and by updating an address map of the slice with the new location of the slice.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in balancing I/O load on data storage systems, the method comprising:
    determining storage capability of each storage container of a set of storage containers included in a storage tier, wherein the storage capability of a storage container indicates a maximum I/O load enabled for the storage container based on storage performance characteristics of the storage container, wherein the set of storage containers include first and second storage containers configured such that storage characteristics associated with the first storage container is different from storage characteristics associated with the second storage container, wherein each storage container includes a set of slices;
    evaluating I/O load of each storage container of the set of storage containers, wherein evaluating the I/O load includes determining current I/O load and desired I/O load of each storage container, wherein the desired I/O load for a storage container is determined based on a storage utilization ratio of the storage tier and the storage capability of the storage container; and
    based on the evaluation, relocating a slice from the first storage container to the second storage container based on storage capabilities of the first and second storage containers, wherein the slice is relocated from the first storage container to the second storage container upon determining that the current I/O load of the first storage container is greater than the desired I/O load for the first storage container and the current I/O load of the second storage container is less than the desired I/O load for the second storage container indicating that the first storage container is over-utilized and the second storage container is under-utilized, wherein the slice is relocated by using a temporary slice relocation list, wherein the temporary slice relocation list includes a set of slices identified for relocation and temporarily holds the set of slices prior to relocating the set of slices from a source storage container to a destination storage container, wherein the current I/O load of each storage container is managed by relocating slices among the set of storage containers in order for each storage container to achieve similar storage utilization, wherein storage utilization of each storage container of the set of storage containers is changed by relocation of the slices among the set of storage containers for balancing I/O load across the storage containers, wherein storage utilization of a storage container is determined based on total I/O load and storage capability of the storage container.

2. The method of claim 1, further comprising:
    determining a storage utilization ratio of the storage tier, wherein the storage utilization ratio is derived using total I/O load of the storage tier and total storage capability of the storage tier.

3. The method of claim 1, further comprising:
    tracking I/O activity for each storage container of the set of storage containers of the storage tier;
    determining the desired I/O load for each storage container of the set of storage containers of the storage tier, wherein the desired I/O load of a storage container is derived using a storage utilization ratio of the storage tier and a storage capability of the storage container; and
    selecting a slice for relocation from a first storage container of the set of storage containers to a second storage container of the set of storage containers based on I/O activities and desired I/O loads of the first and second storage containers.

4. The method of claim 1, wherein a storage container comprises a set of slices, each slice of the set of slices is a logical representation of a subset of physical disk storage.

5. The method of claim 1, wherein I/O load of a slice in a storage container of a storage tier is based on I/O activity of the slice, wherein I/O load of the slice is derived using total slice I/O counts as I/O activity.

6. The method of claim 1, wherein a storage container includes a disk drive system comprising a plurality of Redundant Array of Inexpensive Disks (RAID) systems, each RAID system of the plurality of RAID systems having a first disk drive and a second disk drive.

7. The method of claim 1, further comprising:
creating an object in memory of a data storage system for each storage container of the set of storage containers of the storage tier, wherein the object includes information regarding slices of the storage container.

8. The method of claim 1, further comprising:
creating a slice holder object for storing information regarding slices to be relocated from the first storage container of the storage tier to the second storage container of the storage tier.

9. The method of claim 1, further comprising:
a) comparing total I/O load of a storage container of the set of storage containers of the storage tier with a desired I/O load of the storage container;
b) determining, based on whether total I/O load of the storage container is greater than the desired I/O load of the storage container, whether to select a slice from the storage container for relocation; and
repeating steps a-b until each storage container of the set of storage containers of the storage tier are evaluated.

10. The method of claim 1, further comprising;
a) comparing total I/O load of a storage container of the set of storage containers of the storage tier with a desired I/O load of the storage container;
b) determining, based on whether total I/O load of the storage container is less than the desired I/O load of the storage container, whether to relocate a slice from a slice holder object to the storage container; and
repeating steps a-b until each storage container of the set of storage containers of the storage tier are evaluated.

11. A system for use in balancing I/O load on data storage systems, the system comprising a processor configured to:
determine storage capability of each storage container of a set of storage containers included in a storage tier, wherein the storage capability of a storage container indicates a maximum I/O load enabled for the storage container based on storage performance characteristics of the storage container, wherein the set of storage containers include first and second storage containers configured such that storage characteristics associated with the first storage container is different from storage characteristics associated with the second storage container, wherein each storage container includes a set of slices;
evaluate I/O load of each storage container of the set of storage containers, wherein evaluating the I/O load includes determining current I/O load and desired I/O load of each storage container, wherein the desired I/O load for a storage container is determined based on a storage utilization ratio of the storage tier and the storage capability of the storage container; and
based on the evaluation, relocate a slice from the first storage container to the second storage container based on storage capabilities of the first and second storage containers, wherein the slice is relocated from the first storage container to the second storage container upon determining that the current I/O load of the first storage container is greater than the desired I/O load for the first storage container and the current I/O load of the second storage container is less than the desired I/O load for the second storage container indicating that the first storage container is over-utilized and the second storage container is under-utilized, wherein the slice is relocated by using a temporary slice relocation list, wherein the temporary slice relocation list includes a set of slices identified for relocation and temporarily holds the set of slices prior to relocating the set of slices from a source storage container to a destination storage container, wherein the current I/O load of each storage container is managed by relocating slices among the set of storage containers in order for each storage container to achieve similar storage utilization, wherein storage utilization of each storage container of the set of storage containers is changed by relocation of the slices among the set of storage containers for balancing I/O load across the storage containers, wherein storage utilization of a storage container is determined based on total I/O load and storage capability of the storage container.

12. The system of claim 11, further comprising:
determine a storage utilization ratio of the storage tier, wherein the storage utilization ratio is derived using total I/O load of the storage tier and total storage capability of the storage tier.

13. The system of claim 11, further comprising:
track I/O activity for each storage container of the set of storage containers of the storage tier;
determine the desired I/O load for each storage container of the set of storage containers of the storage tier, wherein the desired I/O load of a storage container is derived using a storage utilization ratio of the storage tier and a storage capability of the storage container; and
select a slice for relocation from a first storage container of the set of storage containers to a second storage container of the set of storage containers based on I/O activities and desired I/O loads of the first and second storage containers.

14. The system of claim 11, wherein a storage container comprises a set of slices, each slice of the set of slices is a logical representation of a subset of physical disk storage.

15. The system of claim 11, wherein I/O load of a slice in a storage container of a storage tier is based on I/O activity of the slice, wherein I/O load of the slice is derived using total slice I/O counts as I/O activity.

16. The system of claim 11, wherein a storage container includes a disk drive system comprising a plurality of Redundant Array of Inexpensive Disks (RAID) systems, each RAID system of the plurality of RAID systems having a first disk drive and a second disk drive.

17. The system of claim 11, further comprising:
create an object in memory of a data storage system for each storage container of the set of storage containers of the storage tier, wherein the object includes information regarding slices of the storage container.

18. The system of claim 11, further comprising:
create a slice holder object for storing information regarding slices to be relocated from the first storage container of the storage tier to the second storage container of the storage tier.

19. The system of claim 11, further comprising:
a) compare total I/O load of a storage container of the set of storage containers of the storage tier with a desired I/O load of the storage container;
b) determine, based on whether total I/O load of the storage container is greater than the desired I/O load of the storage container, whether to select a slice from the storage container for relocation; and
repeating a) and b) until each storage container of the set of storage containers of the storage tier are evaluated.

20. The system of claim 11, further comprising;
a) compare total I/O load of a storage container of the set of storage containers of the storage tier with a desired I/O load of the storage container;
b) determine, based on whether total I/O load of the storage container is less than the desired I/O load of the storage container, whether to relocate a slice from a slice holder object to the storage container; and
repeating a) and b) until each storage container of the set of storage containers of the storage tier are evaluated.

* * * * *